United States Patent
Tamir et al.

(10) Patent No.: US 6,957,390 B2
(45) Date of Patent: Oct. 18, 2005

(54) METHOD AND APPARATUS FOR PROVIDING DYNAMIC INFORMATION TO A USER VIA A VISUAL DISPLAY

(75) Inventors: Moshe Tamir, Ardsley, NY (US); Archer Rosenblum, Millington, NJ (US); Issac Levy, New York, NY (US); Richard Martino, New York, NY (US)

(73) Assignee: Mediacom.net, LLC, New York, NY (US)

( * ) Notice: Subject to any disclaimer, the term of this patent is extended or adjusted under 35 U.S.C. 154(b) by 441 days.

(21) Appl. No.: 09/728,613

(22) Filed: Nov. 30, 2000

(65) Prior Publication Data

US 2002/0063735 A1 May 30, 2002

(51) Int. Cl.[7] .................................................. G09G 5/00
(52) U.S. Cl. ..................... 715/744; 715/738; 715/748; 715/734; 709/201; 709/203; 709/206
(58) Field of Search .................................. 715/738, 741, 715/743–749; 709/201, 203, 206; 345/735–749, 762, 764, 765

(56) References Cited

U.S. PATENT DOCUMENTS

| | | | |
|---|---|---|---|
| 5,717,860 A | * | 2/1998 | Graber et al. ................ 709/227 |
| 5,717,923 A | * | 2/1998 | Dedrick ....................... 707/102 |
| 5,727,129 A | * | 3/1998 | Barrett et al. ................. 706/10 |
| 5,862,325 A | | 1/1999 | Reed et al. ............ 395/200.31 |
| 5,892,917 A | * | 4/1999 | Myerson ....................... 709/224 |
| 5,897,622 A | | 4/1999 | Blinn et al. ................... 705/26 |
| 5,930,801 A | | 7/1999 | Falkenhainer et al. ...... 707/103 |
| 5,991,735 A | * | 11/1999 | Gerace ......................... 705/10 |
| 6,009,410 A | * | 12/1999 | LeMole et al. ................ 705/14 |
| 6,014,638 A | | 1/2000 | Burge et al. ................... 705/27 |
| 6,052,730 A | * | 4/2000 | Felciano et al. ............ 709/225 |
| 6,085,242 A | | 7/2000 | Chandra ....................... 709/223 |
| 6,133,912 A | * | 10/2000 | Montero ....................... 345/716 |
| 6,138,155 A | * | 10/2000 | Davis et al. ................. 709/224 |
| 6,223,215 B1 | * | 4/2001 | Hunt et al. ................... 709/217 |
| 6,353,834 B1 | * | 3/2002 | Wong et al. ................. 707/202 |
| 6,418,471 B1 | * | 7/2002 | Shelton et al. .............. 709/227 |
| 6,572,662 B2 | * | 6/2003 | Manohar et al. ............ 715/526 |
| 2001/0029527 A1 | * | 10/2001 | Goshen ....................... 709/218 |

\* cited by examiner

*Primary Examiner*—John Cabeca
*Assistant Examiner*—Tadesse Hailu
(74) *Attorney, Agent, or Firm*—Darby & Darby

(57) ABSTRACT

A client-server system for recording web site activity by web users and dynamically customizing web display apparatuses for optimal information presentation based on the users' prior activity history. The system assigns each user a user identifier that allows the system to track the user's web sessions. The system also assigns every web site an application identifier that allows the system to track the user's activities at a particular web site. The system then records the user's activities as they visit different web sites via the user and application identifiers. The system determines how the user prefers to view each web site based on their prior activity, their preferences, the web site, and various other factors. As the user surfs from web site to web site, the system dynamically configures the user's web browser and the web page information for optimum presentation based on how the user prefers to view the web site.

6 Claims, 20 Drawing Sheets

FIG. 5

| DATA POINT | DESCRIPTION |
|---|---|
| USER IDENTIFIER | UNIQUE IDENTIFIER FOR THE USER THIS IS A 38-CHARACTER FIELD |
| USER NUMBER | INTERNAL NUMBER USED FOR FOREIGN KEY WITHIN THE DATABASE SYSTEM |
| IP ADDRESS | LAST IP ADDRESS OF USER |
| COUNTRY CODE | COUNTRY CODE OF USER BASED ON LAST LOGIN |
| LAST LOGIN | LAST LOGIN DATE |

FIG. 6

| DATA POINT | DESCRIPTION |
|---|---|
| USER NUMBER | INTERNAL NUMBER USED FOR FOREIGN KEY WITHIN THE DATABASE SYSTEM |
| APPLICATION IDENTIFIER | APPLICATION THAT IS IN SESSION WITH SERVER |
| IP ADDRESS | IP ADDRESS USED DURING SESSION |
| SESSION START | TIME AND DATE OF START OF SESSION |
| SESSION END | TIME AND DATE OF END OF SESSION |
| SESSION IDENTIFIER | UNIQUE SESSION IDENTIFIER |

| DATA POINT | DESCRIPTION |
|---|---|
| APPLICATION IDENTIFIER | UNIQUE IDENTIFIER OF THE APPLICATION |
| APPLICATION NAME | TEXT NAME TO DESCRIBE APPLICATION IDENTIFIER SUCH AS SHOPPING TOOLBAR, TEEN CHAT, ETC. |
| APPLICATION MESSAGE INTERVAL | INDICATES THE FREQUENCY AT WHICH A NEW MESSAGE SHOULD BE PROVIDED TO THE CLIENT FROM THE MESSAGE QUEUE. TIME IN SECONDS. |
| WELCOME WAIT INTERVAL | INDICATES HOW LONG TO WAIT BEFORE REQUESTING THE NEXT DISPLAY MESSAGE FROM THE MESSAGE QUEUE. TIME IN SECONDS. |
| CLIENT QUERY TIME INTERVAL | HOW FREQUENTLY THE CLIENT SHOULD QUERY THE SERVER FOR INFORMATION. TIME IN SECONDS. |
| APPLICATION VERSION | CURRENT VERSION OF THE APPLICATION |
| APPLICATION UPDATE URL | FOR AUTO-UPDATE - WHERE TO FIND THE NEWEST VERSION OF THE APPLICATION |

| DATA POINT | DESCRIPTION |
|---|---|
| APPLICATION IDENTIFIER | UNIQUE IDENTIFIER OF THE APPLICATION |
| COUNTRY CODE | COUNTRY CODE OF MESSAGE. A DEFAULT WILL BE USED FOR COUNTRIES NOT LISTED. |
| NAVIGATION URL | URL TO NAVIGATE |

FIG. 9

| DATA POINT | DESCRIPTION |
|---|---|
| APPLICATION IDENTIFIER | UNIQUE IDENTIFIER OF THE APPLICATION |
| BEHAVIOR TYPE | TYPE OF USER, FINANCE, SPORTS, STYLE, ETC. THE BEHAVIOR TYPE OF STYLE 1 - STYLE 1000 IS RESERVED FOR THE STYLE OF PRESENTATION. |
| TAG NAME | APPLICATION SPECIFIC INFORMATION TAG |
| VALUE NAME | APPLICATION SPECIFIC VALUE FOR TAG |

FIG. 10

| DATA POINT | DESCRIPTION |
|---|---|
| USER NUMBER | INTERNAL NUMBER USED FOR FOREIGN KEY WITHIN THE DATABASE SYSTEM |
| USER BEHAVIOR TYPE | TYPE OF USER, FINANCE, SPORTS, ETC. |
| WEIGHT | HOW THE TYPE WEIGHS AGAINST OTHER TYPES |

FIG. 11

| DATA POINT | DESCRIPTION |
|---|---|
| USER NUMBER | INTERNAL NUMBER USED FOR FOREIGN KEY WITHIN THE DATABASE SYSTEM |
| SESSION IDENTIFIER | DATE OF USING THIS URL |
| DOMAIN | DOMAIN PART OF URL |
| PAGE | PAGE PART OF URL WITHIN DOMAIN |
| PAGE TYPE | TYPE OF PAGE (SPORTS, FINANCE, ETC.) IF THIS CAN BE DETERMINED |
| DURATION | NUMBER OF SECONDS SPENT ON THIS PAGE |

FIG. 12

| DATA POINT | DESCRIPTION |
|---|---|
| USER NUMBER | INTERNAL NUMBER USED FOR FOREIGN KEY WITHIN THE DATABASE SYSTEM |
| APPLICATION IDENTIFIER | UNIQUE IDENTIFIER OF THE APPLICATION |
| APPLICATION VERSION | VERSION OF USERS' APPLICATION FOR INFORMATION PURPOSES ONLY |
| DOWNLOAD DATE | DATE APPLICATION WAS DOWNLOADED |
| LAST LOGIN | LAST DATE USER USED THIS APPLICATION |
| LAST MESSAGE ID | THE LAST MESSAGE ID THE CLIENT HAS DISPLAYED |

FIG. 13

| DATA POINT | DESCRIPTION |
|---|---|
| APPLICATION IDENTIFIER | UNIQUE IDENTIFIER OF THE APPLICATION |
| DAY YEAR | DATE REPRESENTATION OF DAY OF YEAR AND YEAR |
| EVENT CODE | CODE FOR AN APPLICATION EVENT SUCH AS POPUP, NAV, UNINSTALL, ETC. |
| COUNT | NUMBER OF TIMES EVENT CODE OCCURRED FOR A GIVEN DAY |

FIG. 14

| DATA POINT | DESCRIPTION |
|---|---|
| APPLICATION IDENTIFIER | UNIQUE IDENTIFIER OF THE APPLICATION |
| BEHAVIOR TYPE | BEHAVIOR TYPE TO SEND THIS MESSAGE. USERS WITH THIS BEHAVIOR TYPE WILL RECEIVE THIS MESSAGE. A BEHAVIOR TYPE OF 'ALL' WILL ALLOW ALL USERS TO RECEIVE THIS MESSAGE |
| MESSAGE NUMBER | A SYSTEM ASSIGNED SEQUENTIAL NUMBER. MESSAGES ARE DISPLAYED IN SEQUENTIAL ORDER TO THE USER |
| MESSAGES | MESSAGES TO BE DISPLAYED IN SEQUENTIAL ORDER TO THE USER |
| COUNTRY CODE | COUNTRY CODE OF MESSAGE. A DEFAULT CODE WILL BE USED FOR COUNTRIES NOT LISTED |
| URL | FULLY QUALIFIED URL |
| BROWSER MODE | THE MODE THE BROWSER WINDOW WILL BE DISPLAYED. EITHER SMALL DIALOG WINDOW OR FULL BROWSER |
| POPUP MODE | THE METHOD THE BROWSER WINDOW WILL BE DISPLAYED. EITHER POPUP OR PULSE ICON |
| BROWSER WIDTH | THE WIDTH OF THE BROWSER WINDOW |
| BROWSER HEIGHT | THE HEIGHT OF THE BROWSER WINDOW |

FIG. 15A

| DESCRIPTION | AVAILABILITY |
|---|---|
| TIME | CURRENT TIME |
| USER IDENTIFIER | UNIQUE IDENTIFIER ASSIGNED TO EACH CLIENT<br>THIS IS A THIRTY-EIGHT CHARACTER VALUE |
| USER IP | IP ADDRESS OF THE USER |
| ACTIVITY | TEXT FIELD TO DESCRIBE ACTIVITY<br><br>POPUP<br>A POPUP MESSAGE WAS RECEIVED<br><br>CLICK<br>THE WINK TRAY ICON WAS CLICKED TO BRING UP A DIALOG BOX (FOR ICONS THAT HAVE DIALOG BOXES)<br><br>NAV<br>THE USER NAVIGATED TO THE SITE<br><br>SESSION<br>END-OF-SESSION RECORD<br><br>UNINSTALL<br>THE USER UNINSTALLED THEIR SOFTWARE |

METHOD AND APPARATUS FOR PROVIDING DYNAMIC INFORMATION TO A USER VIA A VISUAL DISPLAY

FIELD OF THE INVENTION

The present invention generally relates to the presentation of web site information on Internet web browsers. More specifically, this invention relates to the dynamic display of web site information via a method and apparatus that tracks web site use by individual web users, and then dynamically configures the user's web browser and displayed information for optimum presentation based on the user's prior activity and preferences.

BACKGROUND OF THE INVENTION

The Internet has created a wealth of knowledge and information on a scale previously unimaginable. From commercial web sites to individual homepages, government resources to educational institutions, web surfers are exposed to a vast array of information that varies in purpose, presentation, language, complexity, and functionality.

In addition to various web site designs, the interests of individual web surfers determine the manner in which web sites are accessed and utilized. Novice web surfers prefer simplicity and ease of use, whereas expert surfers prefer functionality and flexibility. Patterns of individual use further diverge with different areas of interest such as news, merchandise, sports, science, and education.

In contrast to the diversity of web sites and use patterns, Internet web browsers are markedly generic, with minimal capability to be tailored for individual use. The two most prominent web browsers, NETSCAPE NAVIGATOR and MICROSOFT INTERNET EXPLORER, limit individual customization to manual, static processes such as selecting a homepage, book marking web site addresses, displaying and hiding navigational toolbars, and setting global appearance features.

The combination of different web sites, individual preferences, and generic web browsers guarantees that web users surfing from web site to web site are never presented with web page information in their preferred fashion. They are thus faced with equally unattractive choices of either exhaustively and repeatedly reconfiguring browser settings throughout a web session, or experiencing frustration and inefficiency as they view web sites in less than ideal conditions. Significantly, those most affected are the mainstay web surfers who visit large numbers of web sites.

SUMMARY OF THE INVENTION

These and other deficiencies in the presentation of web page information are addressed by the present invention, which tracks the activities of individual web users, and then dynamically tailors the user's web browser and web information for optimal presentation of information based on the user's prior activity.

The method of the system described herein includes several functions. First, the system assigns each user a user identifier that allows the system to track the user's web sessions. Second, the system assigns every web site an application identifier that allows the system to track the user's activities at a particular web site. Third, the system records the user's activities as they visit different web sites via the user and application identifiers. Fourth, the system determines how the user prefers to view each web site based on their prior activity, their preferences, the web site, and various other factors. Fifth, as the user surfs from web site to web site, the system dynamically configures the user's web browser and the web page information for optimum presentation based on how the user prefers to view the web site.

The apparatus used to implement this system is a client-server system. On the client or user side, web display applications track the user's activity at web sites. Every web display application acts as a standalone client program that receives and executes instructions from the server system. Web display applications have common features including popup messages, menu functions, and web browser control. As client programs, web display applications receive instructions from the server system that modify the user's browser and customize presentation of web site information. Each web site has its own web display application. The user installs a web display application for each web site they want the server system to track and customize.

Another component on the client or user side is the desktop system, which includes functions to connect and communicate with the server system and manage web display applications. Yet another component on the client or user side is the message broker, which handles communication between the server system and web display applications. The message broker also handles communication between the server system and other client or user components, including toolbars and the desktop taskbar. These components also respond to server configuration instructions for optimal presentation of information, including presentation of message information to one or more users.

On the server side, content servers record the Universal Resource Locators (URLs) of web sites accessed by users. Download servers maintain program updates and web display applications for each web site which is capable of being tracked by the system. Communication servers interact with users by sending and receiving instructions. Application servers record the user's activities in a database and log files. The database contains user and application specific records that are used for user and application specific activities, including user identification, user characteristics, user preferences, user behavior information, application identification, application characteristics, and application configuration information. Log files track individual user client activity throughout user sessions, including user log in and log out, session activities, download and messaging, and web site activities. An external interface provides for system expansion outside the core server system. Reporting servers generate reports and statistics including user activity, web site activity, and system performance. A message queue holds messages to be sent by the server system to the user based on the user's activity history.

To activate the system, the user connects to the Internet. The desktop system establishes a connection with the server system to receive instructions. If the user is new, the server system first registers the user and assigns them their unique user identifier. Otherwise, the server recognizes the user as a registered client with a prior history.

After logging in, the user invokes one of the web display applications. Once a web display application is running, the server tracks the user's activity at the web site associated with the web display application and customizes the display of the web site's information. The user can open multiple web display applications at once, and the server system tracks the user's activities at every web site that has its web display application running.

The communication servers generate instructions based on the user's prior activity at the web site the user is accessing, provided that the user is running the appropriate web display application. They send these instructions to the corresponding web display application via the message broker. The web display application executes the instructions, thereby changing the user's browser settings and appearance. Thus, the server system optimizes the presentation of web page information based on the user's prior activity at the particular web site.

As the user changes web sites, the communication servers generate new instructions based on the user's activity history at the new web site, provided that the user is running the appropriate web display application. Thus, as the user surfs the net, their web browser is dynamically reconfigured for optimum presentation of information at each web site viewed. The server system records the user's activity at the web sites in a central database and log files for future use. This information is also used by the server system to generate updated instructions for the user's current session based on their most recent activity.

BRIEF DESCRIPTION OF THE DRAWINGS

The foregoing and other features of the present invention will be more readily apparent from the following detailed description and drawings of illustrative embodiments of the invention in which:

FIG. 5 is a table showing a User Information Record;

FIG. 6 is a table showing a User Session Record;

FIG. 7 is a table showing an Application Information Record;

FIG. 8 is a table showing an Application Navigation Information Record;

FIG. 9 is a table showing an Application Customization Record;

FIG. 10 is a table showing a User Behavior Information Record;

FIG. 11 is a table showing a User URL Information Record;

FIG. 12 is a table showing a User Application Information Record;

FIG. 13 is a table showing an Application Tracking Information Record;

FIG. 14 is a table showing a Message Queue Record;

DETAILED DESCRIPTION OF THE PREFERRED EMBODIMENTS

Figure 1:
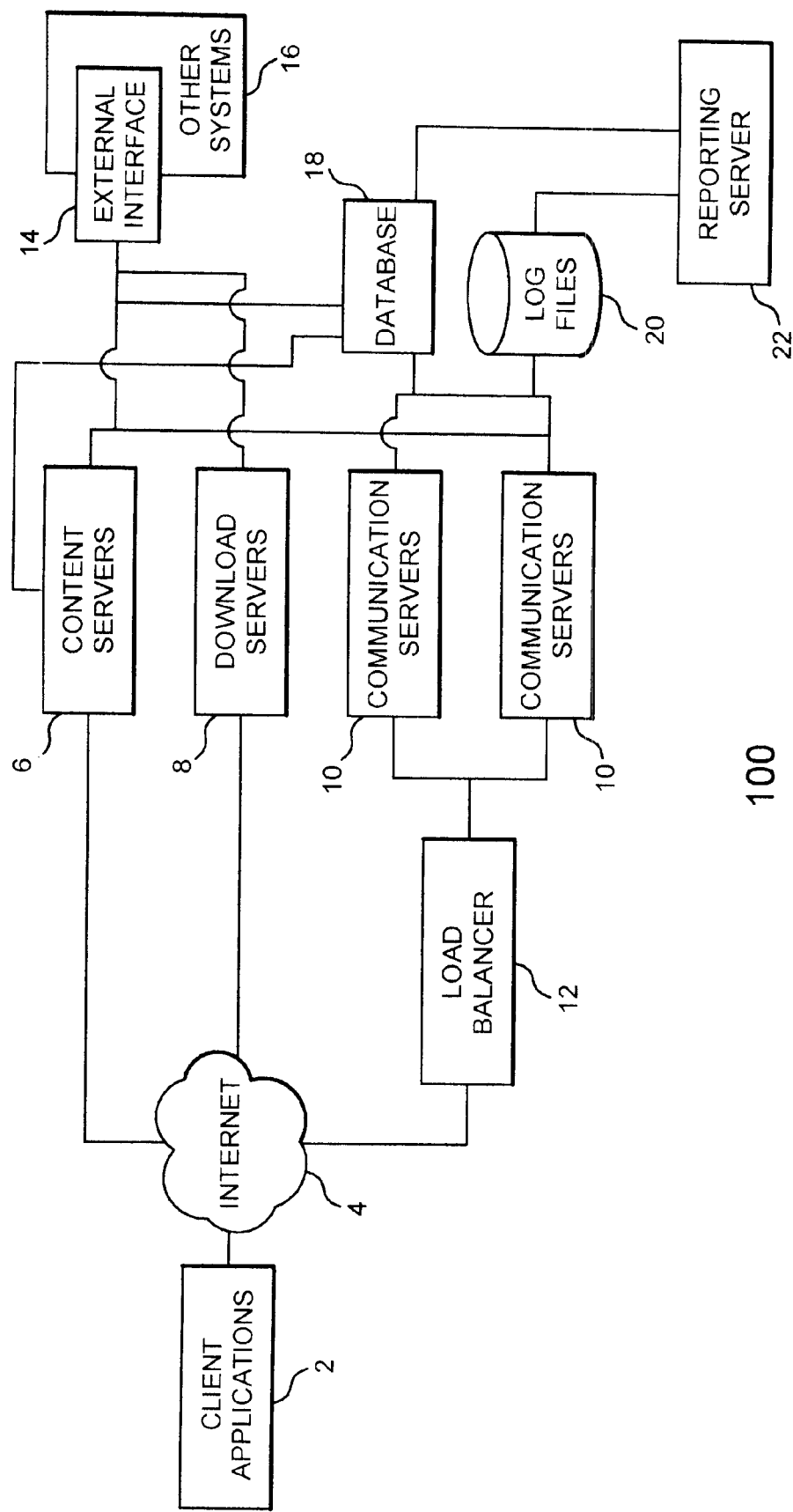
FIG. 1 is a block diagram of the client-server system architecture of an embodiment of the present invention.

Referring now to FIG. 1, therein is shown the overall client-server system architecture 100. The server system includes the content servers 6, download servers 8, communication servers 10, load balancer 12, external interface 14, database 18, log files 20, and reporting server 22. It should be understood that every server shown as a single unit may also be a collection of servers linked together, and that the different server functions may be implemented in a single server. User client applications 2 are connected to the server system via a communications network, such as the Internet 4. It should be understood that the user client applications 2 are any and all user applications that communicate with the server system through the Internet 4, including the desktop system, message broker, web display applications, toolbars, and taskbar.

The desktop system is one of the client applications 2 that interface with the server system. After installing the desktop system, the user connects to the Internet 4 and runs the desktop system application, at which point the message broker begins to exchange messages with the communication servers 10. Communication between the message broker and server system may be established through TCP/IP, which opens a socket between a user and the server system. If the user is new, the desktop system registers the user with the server system, which assigns the user a unique user identifier. Otherwise, the system recognizes the user as a prior user who is registered with the server system.

After logging in and establishing a valid client-server connection, the user opens additional user client applications 2, including web display applications for different web sites. These applications exchange instructions with the communication servers 10 via the desktop system's message broker. As the user visits different web sites, the corresponding web display applications transmit information about the user's activities at those sites to the communication servers 10. The communication servers 10 access the database 18 and log files 20, determine the user's prior activities at the web sites, and generate instructions that optimize the user's web browser for those sites based on the web site the user is viewing, the user's prior activity at the site, the user's preferences, and other factors. These instructions are sent back to the corresponding web display applications, which execute the instructions to dynamically configure the user's web browser. The communication servers 10 also record the user's current activity at the web site in the database 18 and log files 20 for future use. In addition to generating instructions for web display applications, the communication servers 10 generate instructions for additional client applications 2, including instructions for modifying toolbars and the taskbar. These instructions are based on the web site the user is viewing, the user's prior history at the web site, the user's preferences, and other factors.

The content servers 6 contain messages that are sent to user client applications 2. The content servers 6 query the database 18 to determine which messages to send to the user based on the web site the user is viewing, the user's prior history at the web site, the user's preferences, and other factors. The content servers then queue the appropriate messages and send them to the corresponding user client application 2.

The download servers 8 contain program and information updates for user client applications 2. The server system compares the versions of the user client applications 2 with client application version information stored in records in the database 18. If a comparison reveals that a newer version or additional data is available for the user client applications 2, the download servers 8 transmit the updated information to the user client applications 2, or supply the appropriate web address where the program update is available.

The content servers 6 and download servers 8 communicate with other systems 16 outside the core server system through an external interface 14. These other systems 16 send content and instructions through the external interface 14 to the content servers 6 and download servers 8, thereby allowing external systems to control, configure, and update the information provided to the user client applications 2. In this way, for example, an operator of a web site can provide information to be presented by way of web display applications associated with their web site. The reporting server 22 interfaces with the database 18 and log files 20 to determine the system status, user traffic, and other administrative statistics, and also to generate usage reports.

The server system communicates with multiple users simultaneously while they are on the Internet 4 and logged into the server system. The communication servers 10 track the activities of each user client application via the user and application identifiers transmitted from the client applications 2 to the communication servers 10. Thus, the activity for each user is recorded in the database 18 and log files 20 for future use.

Figure 2:
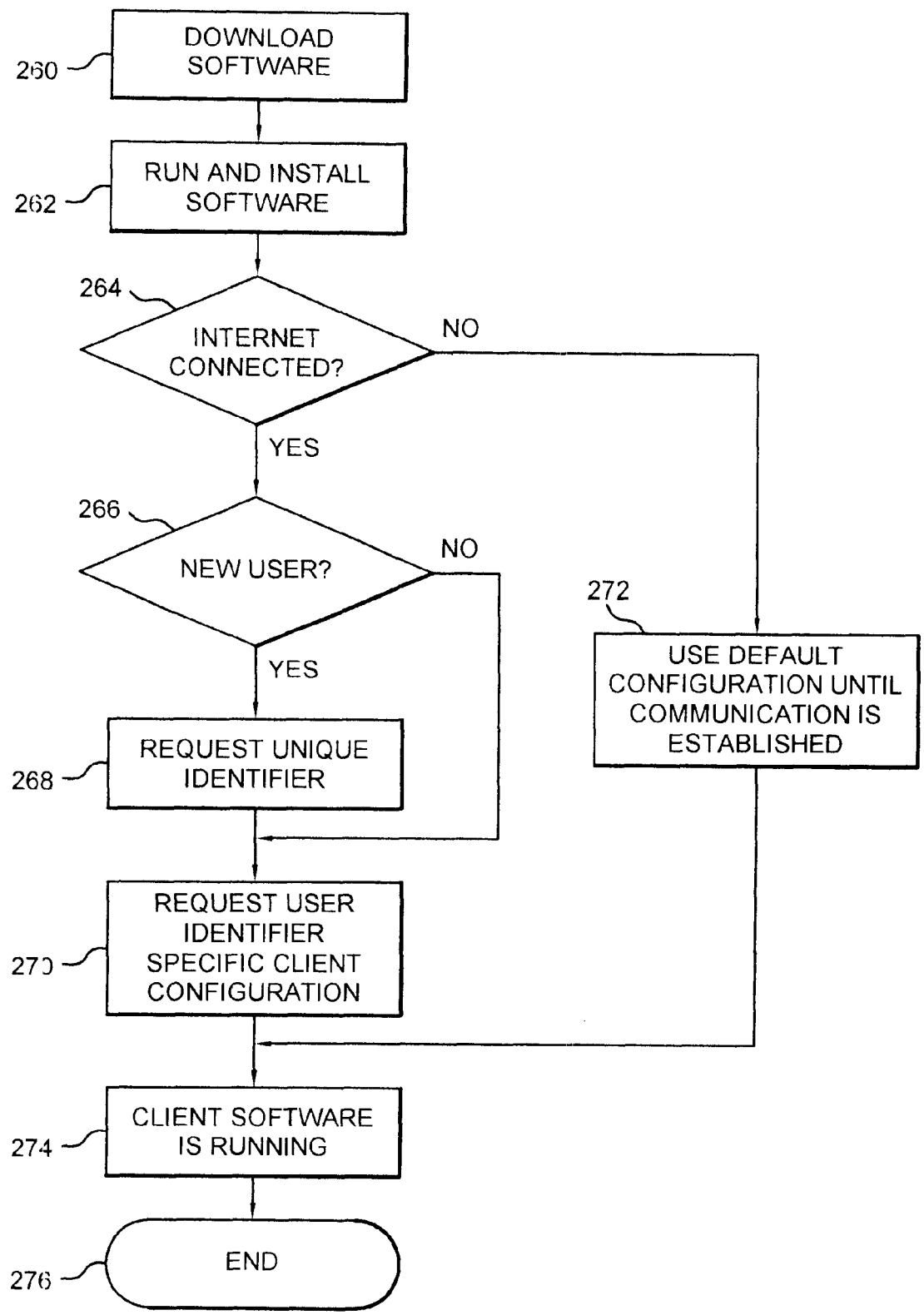
FIG. 2 is a flowchart of the User Identifier Request Process of the present invention.

The User Identifier Request Process, wherein the user installs client software and registers with the server system, is shown in FIG. 2. Referring now to FIG. 2, the User Identifier Request Process begins when the user downloads the desktop system client application software to their computer (step 260) via common means such as the Internet or CD-ROM. The user then runs the software on their computer, thereby installing and running the desktop system client application (step 262).

After installing and running the desktop system, it is then determined if the user's computer has a valid Internet connection (step 264). If not, the process proceeds to step 272, wherein the desktop system uses its default settings until it establishes communications with the server system. If so, the process proceeds to step 266, wherein the desktop system contacts the server system to register and configure itself.

If the process proceeds to step 266, it is then determined if the user is new and needs to register with the server system. The server system determines if the user is new by searching for a pre-existing unique user identifier stored on the user's computer (step 266). If a user identifier is found on the user's computer, the user is already registered with the server system, and the process proceeds to step 270. If a user identifier is not found on the user's computer, the user is new and not registered with the server system, and the process proceeds to step 268. At step 268, the desktop system requests a unique user identifier from the server system, which generates and sends a user identifier back to the desktop system. The desktop system stores the received user identifier on the user's computer, thereby registering the user for future client-server sessions (step 268).

After registering with the system, the desktop system then requests user specific client configuration information from the server system (step 270). After receiving configuration information updates, the desktop system proceeds to run in its usual fashion by managing the main client-server session and other user client applications run by the user (step 274).

Figure 3:
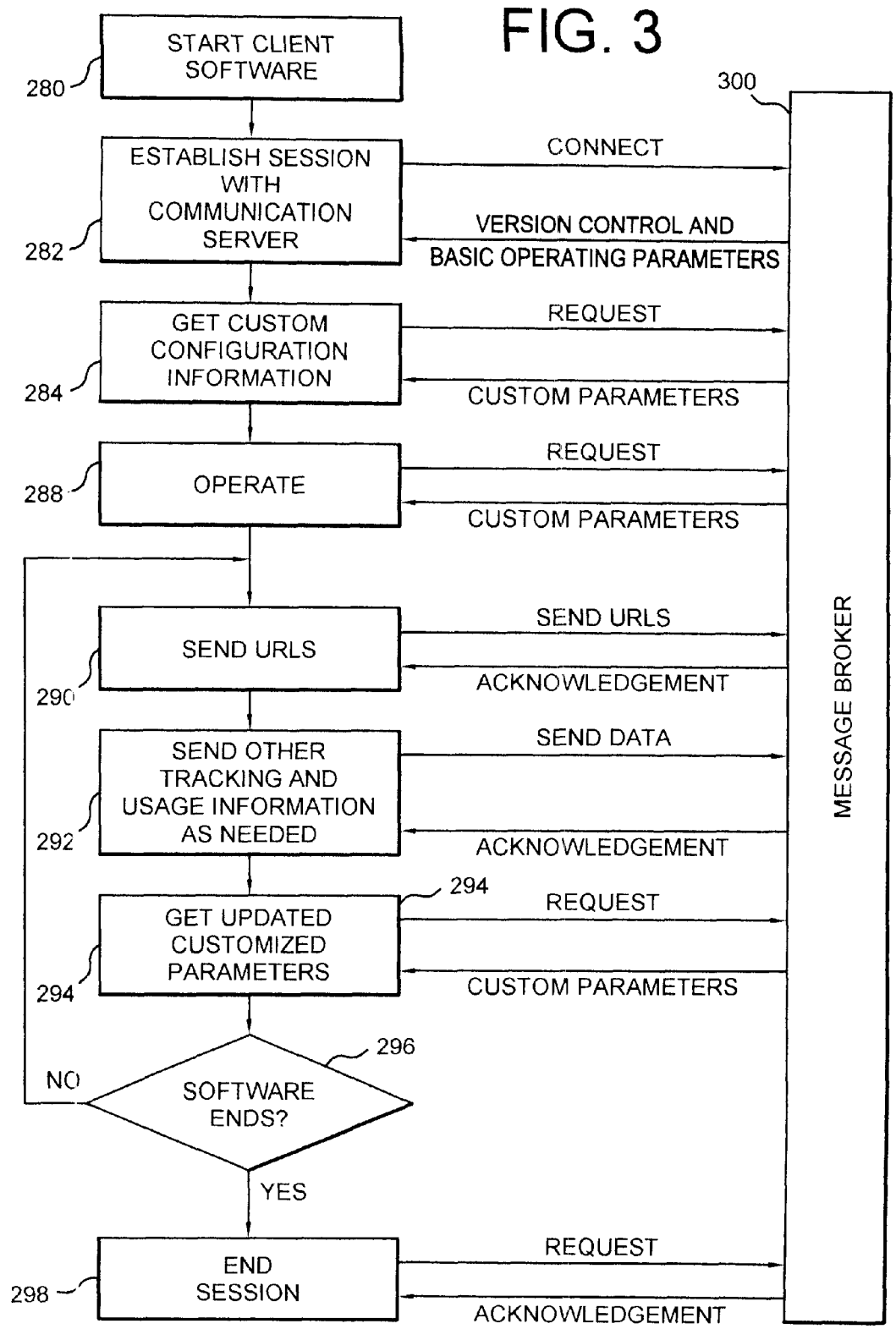
FIG. 3 is a flowchart of the Session Communication Process of the present invention.

The Session Communication Process, wherein a client application 2 initiates a client session and communicates with the server system, is shown in FIG. 3. All client applications 2 communicate with the server system via the message broker, which handles communication between client applications 2 and the server system. Client applications 2 send requests and data to the message broker, which forwards this client information to the server system. The server system responds to client requests and data by sending requests and data back to the message broker, which forwards this server information to the client applications 2.

Referring now to FIG. 3, the process begins when the user starts the client application by running the client software (step 280). The client application then initiates a client-server session with the server system by sending a connect request to the message broker 300, which opens a TCP/IP socket with a communication server (step 282). The communication server responds by sending version control and operating parameters to the client application, thereby establishing a new client-server session (step 282).

Once the client-server session is established, the client application then requests custom configuration information from the server system, which returns custom client parameters based on factors including the user's preferences and prior use history (step 284). The client application then performs initial client configuration operations, in which the client application reconfigures itself based on the custom parameters received from the server system (step 288).

After performing the initial custom configuration information request and custom configuration operation steps, the client application sends URLs to the server system for those web sites that the user accesses, which the server system acknowledges (step 290). The client application also sends tracking and usage information based on the user's activity, which the server system acknowledges (step 292). The client application further requests additional custom configuration information, which the server system provides, thereby updating and reconfiguring the client application based on the user's most recent activity (step 294).

The client-server session continues until the user chooses to terminate the client application (step 296). As long as the client application runs, the client-server session continues, and the client application continues to send URLs (step 290), send tracking and usage information (step 292), and receive updated custom parameters (step 294). If the user ends the client application, however, the client application requests an end of session from the server system, which acknowledges the end of session request from the client application and terminates the session (step 298).

Figure 4:
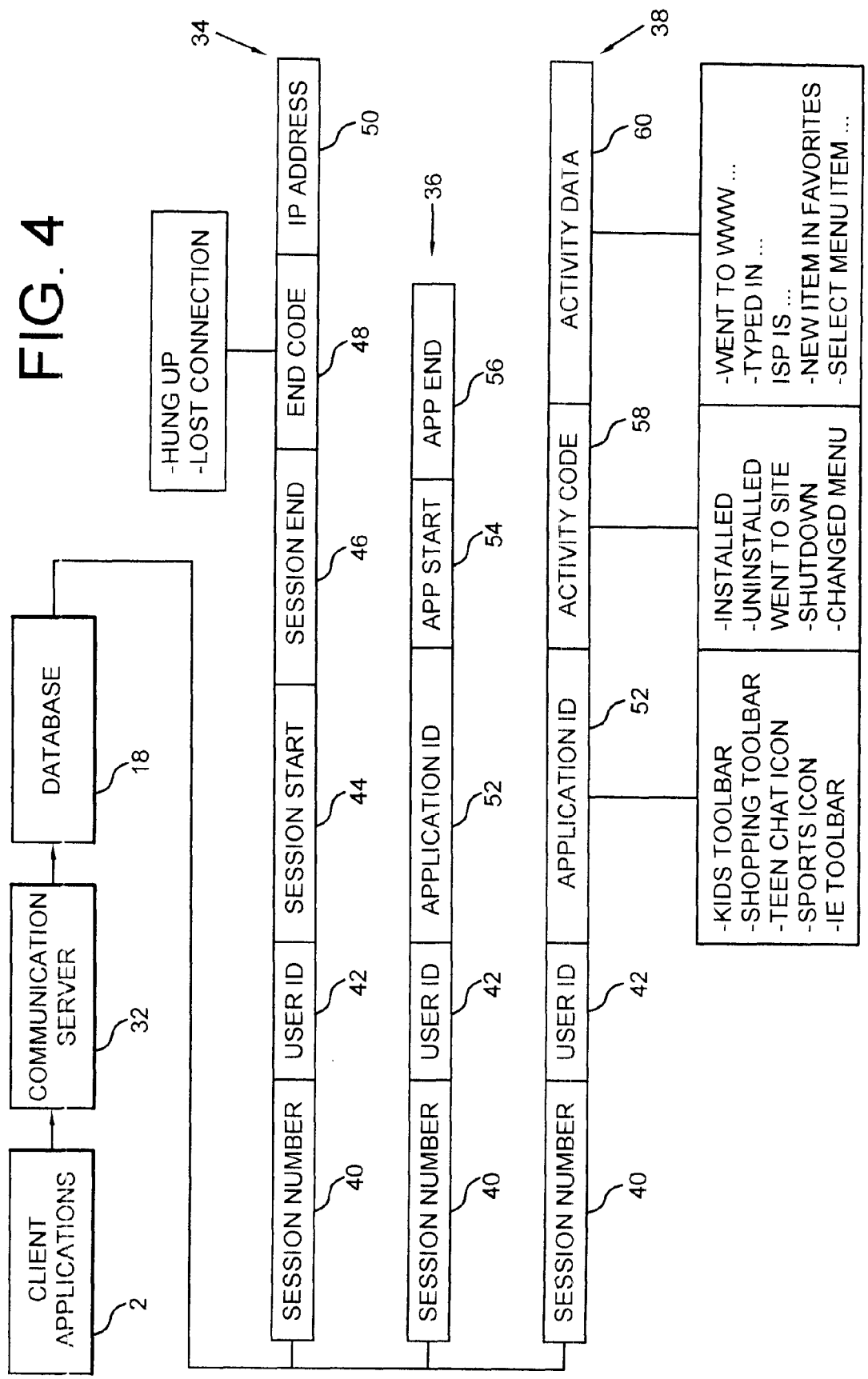
FIG. 4 is a block diagram of the session tracking and data collection architecture according to the present invention.

The session tracking and data collection architecture of the system is shown in detail in FIG. 4. Referring to FIG. 4, user client applications 2 exchange messages with communication servers 32 that handle session management and the collection of data, which is then stored in log files and the server database 18. Typical tracking records such as session records 34, application records 36, and activity records 38 are shown.

A session record 34 includes the Session Identifier 40, User Identifier 42, Session Start 44, Session End 46, End Code 48, and IP Address (internet address) 50. The Session Identifier 40 is a unique session identification which indicates the session in which the client-server communication occurred. The User Identifier 42 is a unique user identification number assigned to a user that is used by the server system to identify the user of client applications. The Session Start 44 and Session End 46 entries indicate the time when the session began and ended, respectively. The End Code 48 indicates how the session was terminated, such as a user hang up or lost connection. The IP Address 50 indicates the internet address from which the client application 2 communicated with the server system during the session.

An application record 36 includes the Session Identifier 40, User Identifier 42, Application Identifier 52, Application Start 54, and Application End 56. The Session Identifier 40 is a unique session identifier which indicates the session in which the client-server communication occurred. The User Identifier 42 is a unique user identification number assigned to a user that is used by the server system to identify the user of client applications. The Application Identifier 52 is a unique application identification number assigned to an application and used by the server system to identify which client application 2 is communicating with the server. The Application Start 54 and Application End 56 entries indicate when the client application began and ended communication with the server system, respectively.

An activity record 38 includes the Session Identifier 40, User Identifier 42, Application Identifier 52, Activity Code 58, and Activity Data 60. The Session Identifier 40 is a unique session identifier which indicates the session in which the client-server communication occurred. The User Identifier 42 is a unique user identification number assigned to a user that is used by the server system to identify the user of client applications. The Application Identifier 52 is a unique application identification number assigned to an application and used by the server system to identify which client application 2 is communicating with the server. The Activity Code 58 and Activity Data 60 are entries indicating the activity the user executed with the application, and the data upon which the user acted, respectively. Examples of activities recorded in the Activity Code 58 include installation, uninstallation, visiting a web site, shutting down, and changing menus. Examples of data recorded in the Activity Data 60 include web site addresses, text entries, Internet Service Providers (ISP), new menu items, and existing menu items.

Referring now to the database record tables, FIG. 5–FIG. 12 are tables showing categories of information the server system records to track user activity and generate instructions for user client applications. The User Information Record is shown in FIG. 5. This record is used by the system for functions including defining user specific characteristics and tracking user activities. There is one User Information Record per user regardless of the number of client applications the user downloads.

Referring to FIG. 5, the User Information Record includes the User Identifier field 42, which is the unique user identification assigned to the user, and a User Number field 72, which is an internal number used to record user specific activities. The User Information Record also includes an IP Address field 50, which is the last internet address from which the user connected with the server system, along with a Country Code field 74, which indicates the country from which the user last accessed the server system. The User Information Record further includes a Last Login field 76, which indicates the last time the user logged into the server system.

Using these fields, the server system is able to track each user's activities and customize the presentation of information to the user. The User Identifier 42 is a unique character string that is assigned for each user that communicates with the server system. The User Number 72 is a unique binary number assigned to each user that communicates with the server system. Whereas the longer User Identifier 42 is transmitted between client applications 2 and the server system, the smaller User Number 72 is used to store individual user records and maintain referential integrity between the user and server database system.

Whenever the system receives data from a client application, the data includes the User Identifier 42. The system compares the received User Identifier 42 with the User Identifier 42 from various User Information Records to determine which user is interacting with the system. By identifying the correct User Information Record, the system can perform user specific functions including identifying the user at login, accessing database and log files to determine the user's prior activities, sending instructions to the user's client applications, and determining the user's corresponding User Number 72. The user's activity is then recorded and retrieved from the database using the smaller User Number 72 in order to reduce storage space while maintaining unique records for each user.

The IP Address 50 is the user's Internet Protocol Address that is used to identify a user on the Internet. The server system uses the IP Address 74 to determine factors including the user's country of connection, Internet Service Provider, and company from which they are connecting. The Country Code 74 indicates the country from which the user is accessing the system, and is used for region specific functions including country, nationality, and language. For instance, by comparing the user's Country Code 74 with country codes associated with different messages and web sites, the server system can identify which set of messages or web sites a user will view, and the language in which the user will view them. The Last Login 76 includes the time and date the user last connected, which is updated whenever a user connects to the system.

The User Session Record is shown in FIG. 6. This record is used by the server system for functions that include tracking and recording user sessions with the server system. Whenever the user connects with a communication server 10, a User Session Record is created, and whenever the user disconnects from the communication server 10, the User Session Record is updated. There is one User Session Record per application per session.

Referring to FIG. 6, the User Session Record includes the User Number field 72, which is an internal number used to record user specific activities, and an Application Identifier field 82, which is the unique identification assigned to the application. The User Session Record also includes the IP Address field 50, which is the user's Internet address during the session. The User Session Record further includes a Session Start field 44 and Session End field 46, which are the session start and end times, respectively. The User Session Record also includes a Session Identifier 40, which is a unique session identification which indicates the session in which the client-server communication occurred.

Using these fields, the server system is able to track each user session and generate statistics about user sessions with the server system. The User Number 72 and Application Identifier 82 provides a unique user and application identification, respectively, that is used by the system to determine which user and application is communicating with the system. Whenever the system receives data from a client application, the data includes a User Identifier 42 and Application Identifier 82. The system retrieves the user's corresponding User Number 72 for the received User Identifier 42, and then creates a new User Session Record by recording the User Number 72, Application Identifier 82, and a Session Number 40 in the database. By using the User Number 72 and Application Identifier 82 to identify which users and client applications initiate client-server sessions with the server system, the server system can thereby track user and client specific sessions, as well as generate user and client specific statistics.

In addition, the server system uses the IP Address 50 to determine the Internet address from which the user and application communicate with the server system throughout the session. The server system can thereby determine statistics including the IP Addresses from which users communicate with the server system, and the IP Addresses from which applications communicate with the server system.

Using the Session Start 304 and Session End 306, the server system can also determine what times the user and application began and completed the client-server session. The server system can thereby determine user-specific statistics including the user session duration and peak time of use, as well as client-specific statistics including client session duration and peak time of use. The server system can also determine system-wide user and client statistics including the average user session duration, average client session duration, user session peak time of use, and client session peak time of use.

The server system uses the Session Identifier 40 to track individual user and client sessions. The server system can thereby maintain multiple User Session Records for identical users and client applications, and generate statistics including the aggregate number of client-server sessions for a particular user and client application, the session frequency for the user and client application, and the peak session time for the user and client application.

The Application Information Record is shown in FIG. 7. This record is used by the server system for functions that include defining application specific characteristics and tracking application activities. There is one Application Information Record per application.

Referring to FIG. 7, the Application Information Record includes the Application Identifier field 82, which is the unique identification assigned to an application, and an Application Name field 84, which is the textual name of the application. The Application Information Record also includes an Application Message Interval field 86, which indicates the period between messages sent from the message queue to the application, and a Welcome Wait Interval field 88, which indicates the amount of time to wait before requesting the next display message from the message queue. The Application Information Record further includes a Client Query Time Interval field 90, which indicates the time period between application queries to the server for information. The Application Information Record also includes an Application Version field 92, which indicates the current version of the application, along with an Application Update URL field 94, which indicates the web address for updating the application.

Using these fields, the server system is able to track each application's activities and customize the presentation of information to the user based on the application. The Application Identifier 82 provides a unique application identification that is used by the system to determine which application is communicating with the system. Whenever the system receives data from a client application, the data includes an Application Identifier 82. The system compares the received Application Identifier 82 with the Application Identifier 82 from various Application Information Records to determine which application is interacting with the system. By identifying the correct Application Information Record, the system can perform application specific functions including processing application requests for information or instructions, accessing the database and log files to determine application characteristics, generating application specific instructions, and sending application specific instructions and messages.

The Application Name 84 allows a simple textual name to be associated with the application. The Application Message Interval 86, Welcome Wait Interval 88, and Client Query Time Interval 90 control how often messages are sent to the application, how long the application waits before requesting additional messages, and how often the application requests new instructions from the server system, respectively. The Application Version 92 indicates the current version of the application, and is compared with the version of the user's client application to determine if updates to the user's application are available. If updates are available, the download server then prompts the user to download the updated version of the application from the web address specified in the Application Update URL 94, or from the download servers 8.

The Application Navigation Record is shown in FIG. 8. This record is used for functions including defining the primary web address the application initially accesses when the application is run. There is one Application Navigation Record per client application per country.

Referring to FIG. 8, the Application Navigation Record includes the Application Identifier field 82, which is the unique identification assigned to the application. The Application Navigation Record also includes a Navigation URL field 102, which indicates the web address for the application to access when the user runs the application, and the Country Code field 74, which indicates the user country for which the Navigation URL 102 applies.

Using these fields, the system determines the initial web address and web information to present to the client application. When a user runs a client application, the server system receives data which includes an Application Identifier 82 and Country Code 74. The server compares this information with the Application Identifier 82 and Country Code 74 in the Application Navigation Records to determine the correct Application Navigation Record. Upon determining the correct Application Navigation Record, the system sends the Navigation URL 102 to the client application, which is loaded as the application's initial web address.

The Application Customization Record is shown in FIG. 9. This record contains application parameters that are related to user behavior. There are multiple Application Customization Records per application per user behavior.

Referring to FIG. 9, the Application Customization Record includes the Application Identifier field 82, which is the unique identification assigned to the application, and a Behavior Type field 112, which is the user's behavior type. The Application Customization Record also includes a Tag Name field 310 and Value Name field 312, which provide a textual information tag and an associated value, respectively, for the application.

Using these fields, the server system can customize user client applications based on the user's behavior type. The server system receives the Application Identifier 82 and Behavior Type 112 from user client applications, which it compares with the Application Identifier 82 and Behavior Type 112 to determine the appropriate Application Customization Record. The server system then sends Tag Name 310 and Value Name 312 information, based on the user's behavior, to the user client application, thereby customizing the user client application. The Tag Name 310 is a specific parameter for the client application, and the Value Name 312 is the parameter's corresponding custom value. Thus, the server system identifies the application and user behavior, and then sends custom tags and tag values to client applications, thereby customizing the application parameters based on the user behavior type.

The User Behavior Information Record is shown in FIG. 10. This record contains weighted information about the user's behavior that is used for functions including determining the configuration of user client applications and dynamically configuring user client applications. There is one record per user per client application.

Referring to FIG. 10, the User Behavior Information Record includes the User Number field 72, which is an internal number used to record user specific activities. The User Behavior Information Field also includes a Behavior Type field 112, which indicates information about the user's type of interests, and a Weight field 114, which indicates the significance or weighting of the Behavior Type 112.

Using these fields, the system records various user activity information, thereby creating a data source representing the user's activity preferences. As a user accesses different web sites, their corresponding user client applications communicate the user's User Identification 42, the URL the user is visiting, and the user's activity at the URL to the server system. The server system uses the received User Identification to identify the user performing the activity, and processes the received user URL and activity information to determine the user's behavior, as well as the significance of the user's behavior. The server system records the user's behavior and the significance of the behavior in a User Behavior Information Record, using the User Number 72, User Behavior Type 112, and Weight 114 to indicate the user, type of activity the user is performing, and the significance of the user's activity, respectively. The server system then uses this information, along with information from other User Behavior Information Records, to perform custom user functions including generating instructions for user client applications, customizing web information appearance, and determining messages to send to the user.

The User URL Information Record is shown in FIG. 11. This record includes user URL tracking information that the server system uses as a database to generate user behavior information. There is one User URL Information Record per user per session per URL.

Referring to FIG. 11, the User URL Information Record includes the User Number field 72, which is an internal number used to record user specific activities, and a Session Identifier field 40, which identifies the session of the user for the URL. The User URL Information Record also includes a Domain field 320 and Page field 322, which are the domain and page portions of the URL, respectively. The User URL Information Record further includes a Page Type field 324, which identifies the type of URL, as well as a Duration field 326, which records the amount of time the user spent at the URL.

Using these fields, the server system records URLs visited by users, thereby creating a database from which the server system generates user behavior information. As a user accesses different web sites, their corresponding user client applications communicate the user's User Identification 42, User Session Identifier 40 and the URL the user is visiting. The server system uses the received User Identification to identify the user performing the activity, and splits the received user URL into its Domain 320 and Page 322 portions. The server system then records the user, session, URL domain name, an URL page name using the User Number 72, Session Identifier 40, Domain 320, and Page 322, respectively. The server system then records the page type for the URL, such as sports, finance, and news under the Page Type 324, and the duration of time the user was at the URL under Duration 326.

The server system uses the User URL Information Records to generate user behavior statistics and customize user client applications. The server system determines user specific activities using the User Number 72, and generates user specific behavior statistics using the Domain 320, Page 322, Page Type 324, and Duration 326 fields. These user specific behavior statistics include the total and average number of times the user visited a URL, the total and average duration the user spent at a URL, the peak times when the user visited the URL, and the types of pages the user visited.

The server system also determines URL specific activities using the Domain 230 and Page 322, and generates URL specific behavior statistics using the User Number 72, Page Type 324, and Duration 326 fields. These URL specific behavior statistics include the total and average number of times that users visit a URL, the total and average amount of time users spend at a URL, the peak times when users visit a URL, and the types of URLs that user's visit.

The User Application Information Record is shown in FIG. 12. This record includes information about client applications the user has downloaded. There is one User Application Information Record per user per client application.

Referring to FIG. 12, the User Application Information Record includes the User Number field 72, which is an internal number used to record user specific activities, and the Application Identifier field 82, which is the unique identification assigned to an application. The User Application Information Record also includes an Application Version field 92, which is the user's current version of the client application, and a Download Date field 122, which is the date the user downloaded the application. The User Application Information Record further includes a Last Login field 124, which is the last date and/or time the user used the application, along with a Last Message Id field 126, which indicates the last message displayed to the user in connection with this application.

Using these fields, the server system can track, update, and service client applications downloaded and installed by the user. The system compares the User Number 72 from the User Application Record with the User Number 72 from various User Information Records to determine the user. The system also compares the Application Identifier 82 from the User Application Record with the Application Identifier 82 from various Application Information Records to determine the application. The system is thereby able to determine the user and the correct User Information Record, as well as the application and the correct Application Information Record.

After determining the user and application, the server system compares the Application Version 92 from the User Application Information Record with the Application Version 92 from the Application Information Record to determine if a more recent version of the user's client application exists. If a more recent version exists, the user is prompted to update their application from the web site specified in the Application Update URL 94 specified in the Application Information Record, or from the download servers 8.

The system records the date the client application was downloaded by the user in the Download Date 122, and records the last date the user logged into the server system in Last Login 124. The system also records the last message the user was sent from the message queues in the Last Message Id 126, and is thereby able to determine the next appropriate message to send to the user from the message queue.

The Application Tracking Record is shown in FIG. 13. This record contains information about application use and application events on a daily basis. There is one Application Tracking Record per application per event type per day. There may be multiple Application Tracking Records for an application depending on, for example, the different types of events.

Referring to FIG. 13, the Application Tracking Record includes the Application Identifier field 82, which is the unique identification assigned to an application, and a DayYear field 132, which is the date representation of the day and year of the current record. The Application Tracking Record also includes an Event Code field 134, which indicates a particular type of event for an application, as well as a Count field 136, which indicates the number of times the Event Code 134 occurred in connection with the application.

Using these fields, the system records application activities, thereby tracking the application activity and providing a database to customize instructions. When a client application sends Application Identifier 82 and Event Code 134 information to the server system, the system compares the received Application Identifier 82, the received Event Code 134, and the current date DayYear 132 with the Application Identifier 82, Event Code 134, and DayYear 132 from various Application Tracking Records. After identifying the correct Application Tracking Record, the server system records the activity by incrementing the Count 136 field. By recording numerous records for different dates, applications, and activities, the system is able to perform functions including tracking all application activities, generating statistics based on the application, activity, date, or a combination of these fields, and creating instructions based on these statistics.

The Message Queue Record is shown in FIG. 14. This record includes the list of messages to display to a user. There is one Message Queue Record per application per country.

Referring to FIG. 14, the Message Queue Record includes the Application Identifier field 82, which is the unique identification assigned to an application, and a Behavior Type field 112, which is the user behavior for which the messages in the queue will be sent to the user. The Message Queue Record also includes a Message Number field 152, which is a sequential number assigned to every message, a Messages field 154, which indicates the list of messages to be sent to the user, and a Country Code field 74, which indicates the country for which the messages in the queue are tailored. The Message Queue Record further includes a URL field 156, indicating a fully qualified web address to send to the user. The Message Queue Record also includes a Browser Mode field 158, which indicates whether the browser window will use a small dialog window or a full window to display the messages sent from the queue, and a Popup Mode field 160, which indicates whether the browser will make the message window popup or pulse the application icon whenever a message is received. The Message Queue Record further includes a Browser Width field 162 and a Browser Height field 164, which define the width and height, respectively, of the browser window that displays the messages.

Using these fields, the server system queues and sends messages to a user client application. The process begins when a client application requests messages from the server system according to the Welcome Wait Interval 88 specified in the Client Information Record. Included in the request is a User Identifier 42 and Application Identifier 82, which the system compares with the User Identifier 42 of various User Information Records to determine the correct User Information Record. By identifying the correct User Information record, the system is able to determine the user's User Number 72 and Country Code 74. The system then compares the Application Identifier 82 and the user's Country Code 76 with the Application Identifier 82 and Country Code 74 from the various Message Queue Records to select a group of appropriate Message Queue Record(s) with different Behavior Types 310.

The system also compares the user's User Number 72 with the User Number 72 of different User Behavior Information Records to determine the user's different Behavior Types 112 and Weights 114. The system processes the user's Behavior Types 112 and Weights 114 to determine which record(s) from the group of appropriate Message Queue Record(s) should be sent to the user based on their behavior. If the Behavior Type 112 specified in the Message Queue record is "ALL," then that record is appropriate to send to the user regardless of his Behavior Types 112 and Weights 114.

After determining the correct Message Queue Record(s), the server system queues Messages 154 to send to the client application. The interval at which the server system sends the messages is defined by the Application Message Interval 86 specified in the appropriate Application Information Record. The Message Number 152 is compared with the Last Message Id 126 to determine the next message to send the user. The URL 156 is also sent to the user, which is displayed by the client application to provide the user with additional information.

When the client application receives a message from the server system, it displays the message for the user. The Browser Width 162, Browser Height 164, Browser Mode 158, and Popup Mode 160 control the message appearance when it is displayed. The Browser Width 162 and Height 164 control the message width and height in the browser window. The Browser Mode 158 and Popup Mode 160 control full window versus small dialog box display, and instant message popup versus pulse icon notification of the user, respectively.

Figure 15B:
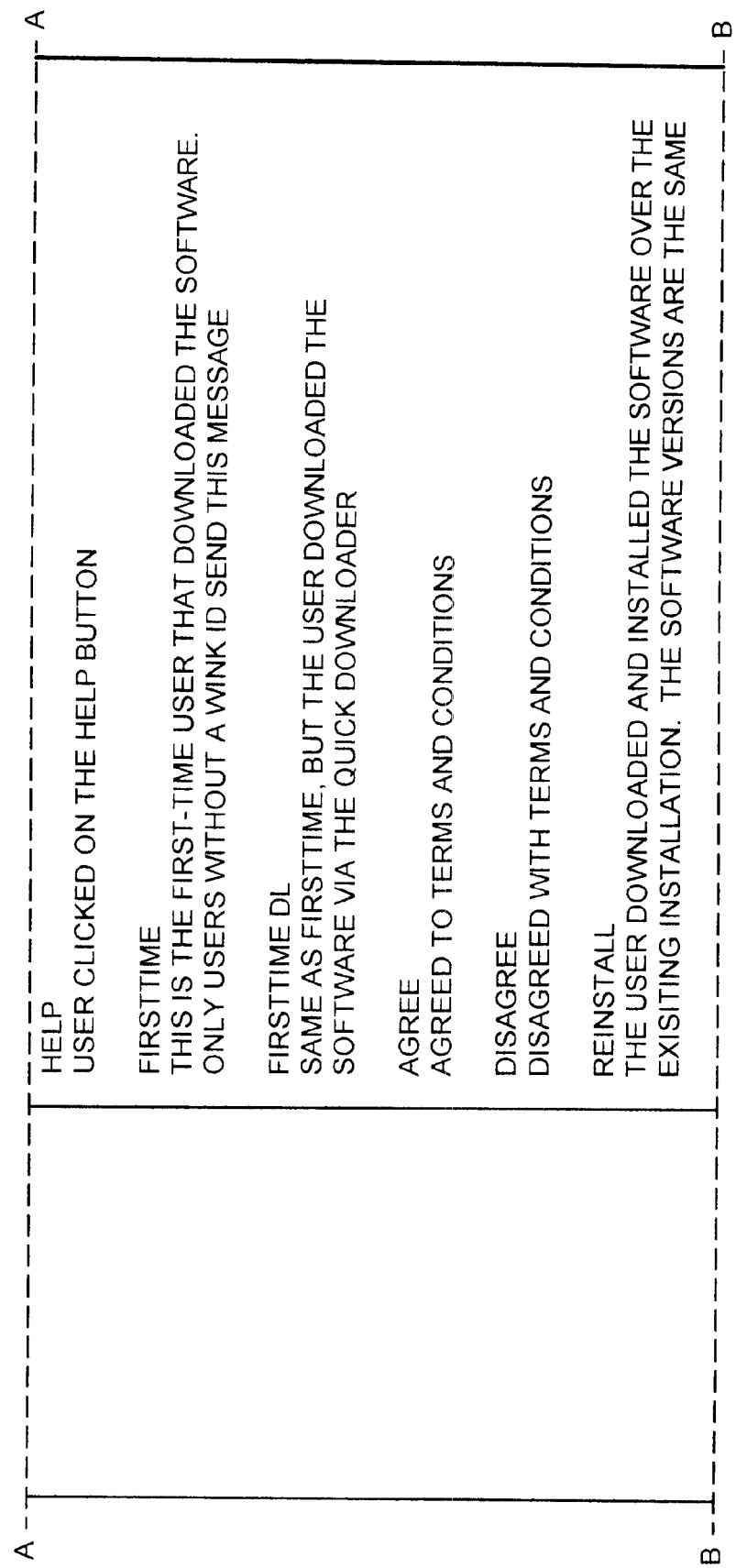
FIG. 15 is a table showing an Activity Log File Record.
Figure 15C:
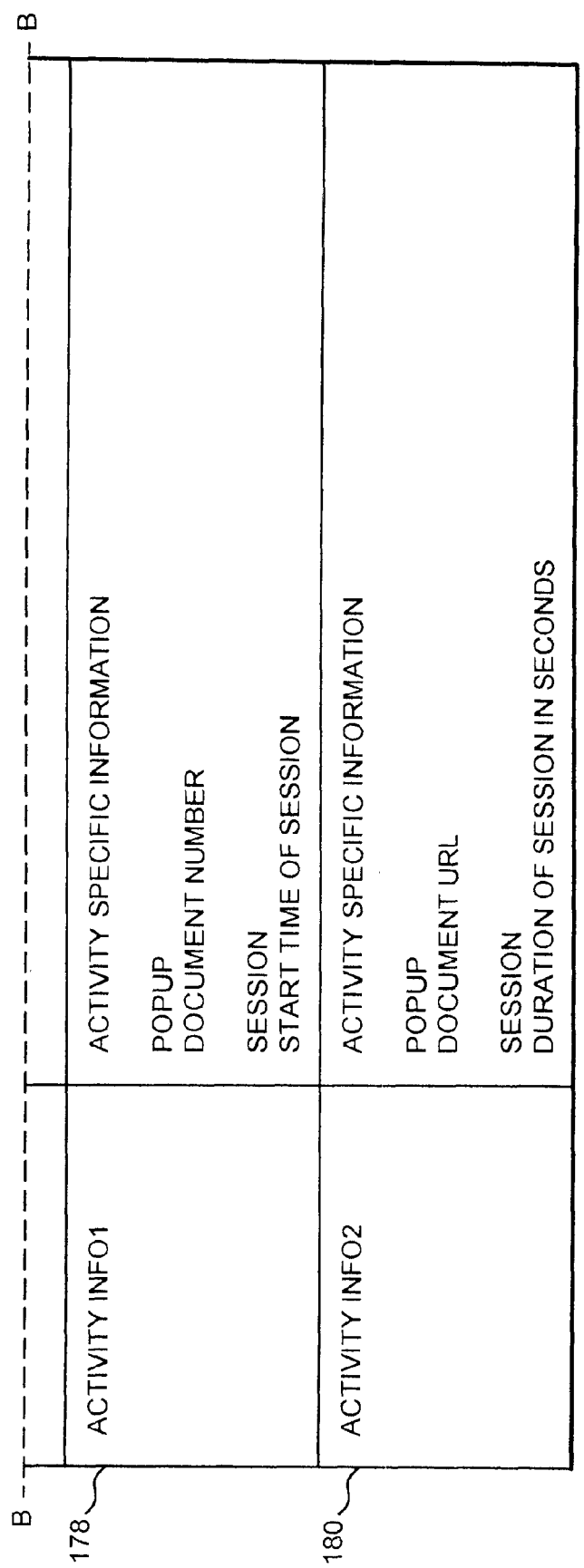

The server system tracks user activity by generating Activity Log Files that record user activities. FIG. 15 shows the format of the Activity Log Files generated by the application servers. These files can be combined to generate a report on all user activities with the application servers and generate statistics about user and system activity.

Referring to FIG. 15, the Activity Log File includes a Time field 172, which is the time the Activity Log file was created, and the User Identifier field 42, which is the unique user identification assigned to each user. The Activity Log File also includes a User IP field 174, which is the user's last internet connection address, and an Activity field 176, which specify various descriptions for different user activities. The Activity Log File further includes the Activity Info 1 field 178 and Activity Info 2 field 180, which are the first two entries illustrative of the activity information entries recorded in the log file.

Using these fields, user activity records are generated and recorded in log files. When the server system receives information from user client applications, it identifies the time the log file was created, user, application, internet address from which the user is connected, and activity the user's client application is executing. The time, user identification, and internet connection address information are stored in the Time 172, User Identifier 42, and User IP 174 fields, respectively.

The Activity field 176 includes one or more shorthand notations for different user activities. Typical notations include POPUP (user received a popup text message), CLICK (user selected an application icon to bring up a dialog box), NAV (user visited a web site), SESSION (user end-of-session actions), HELP (user selected help), FIRST-TIME (user downloaded software for the first time), AGREE (user agreed to terms and conditions), DISAGREE (user disagreed to terms and conditions, and REINSTALL (user downloaded and installed software over the existing version).

Following the Activity list 176, a number of Activity Information entries, indicated by Activity Info 1 178 and Activity Info 2 180, list the user's activity. Each entry contains a shorthand notation of the activity from the Activity list 176, followed by the data upon which the activity was taken. For instance, Activity Info 1 178 shows POPUP and SESSION notations followed by entries. This information indicates the user received a popup message, the message received was from the document "document number," and that the user started the session at "start time of session." Activity Info 2 180 shows POPUP and session notations followed by entries. This information indicates the user received a popup message, the message received was a web page specified by "document URL," and that the session duration was for "duration of session" time.

Once generated, these log files are then used by the system for functions including generating user statistics, generating activity statistics, and creating instructions for user client applications based on prior activity history. The system merely examines the log files, determines the prior activity taken by the user, and then tailors client and system activities according to the user's prior history.

Figure 16:
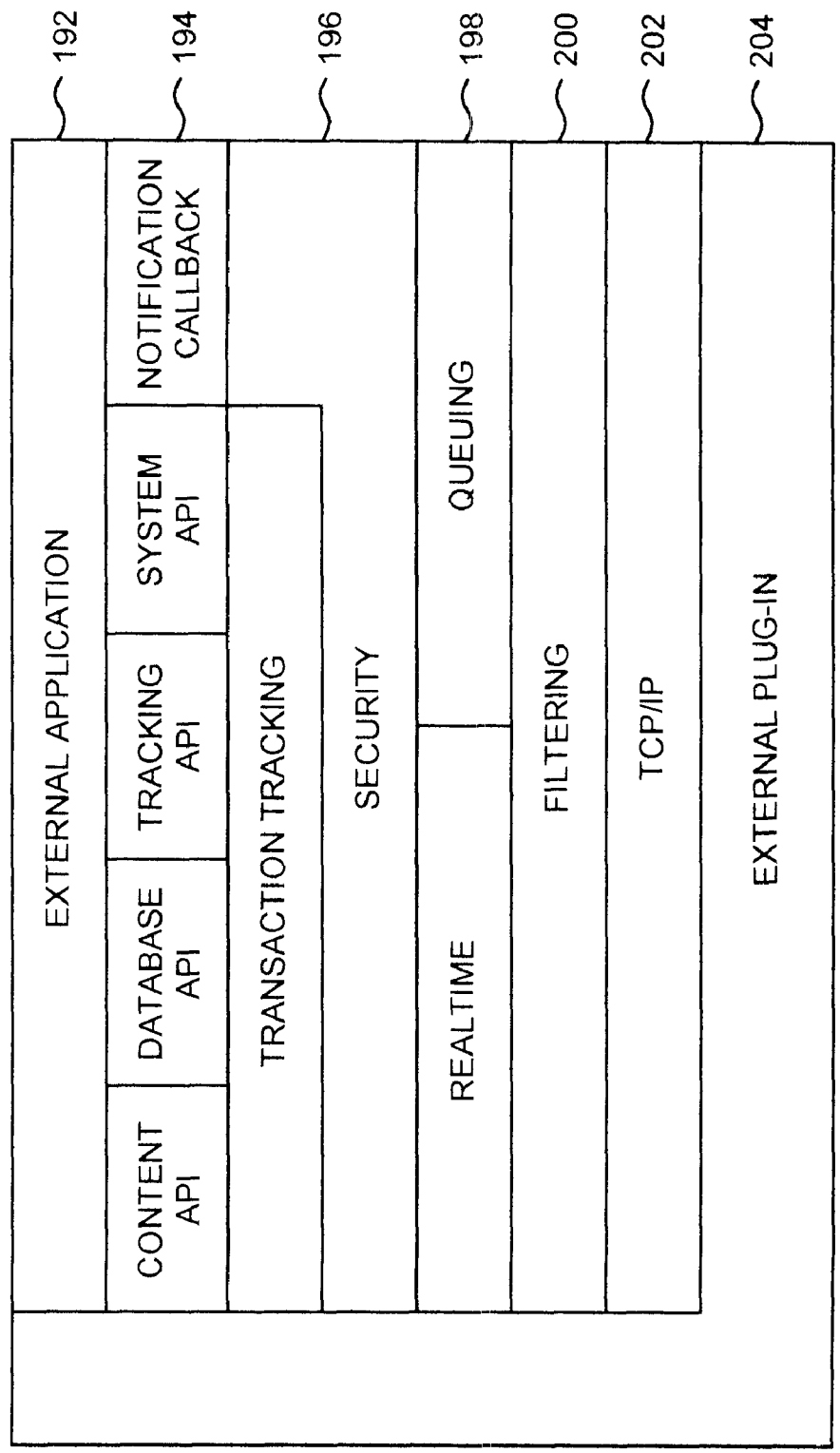
FIG. 16 is a diagram of the external interface protocol in accordance with the present invention.

Referring now to FIG. 1, the server system includes an External Interface 14 that allows it to interface with other systems 16. The details of the External Interface 14 are shown in FIG. 16. Referring to FIG. 16, the External Interface includes five separate layers which are the Application Program Interface (API) and Notification layer 194, Transaction Tracking and Security layer 196, Real Time Transmission and Queuing layer 198, Filtering layer 200, and TCP/IP layer 202. These layers allow external applications 192 to be treated as external plug-ins 204 to the server system.

External applications 192 initially couple to the external interface via the API and Notification layer 194, which includes Content, Database, Tracking, and System APIs. Content APIs include functions for external applications to send web pages and messages to the communication servers, such as setting the delivery time, country, and behavior type for content to send to the user, whereas Database APIs include functions for external applications to access the system database 10 and retrieve user information. Tracking APIs include functions for external applications to access tracking information, including the type of users who view the external application's published content, and System APIs include functions for external applications to register and un-register with the server system, establish and end sessions with the server system, and send and receive status information from the server system. The notification callback is used to notify asynchronous external applications when their requests have been completed by the server system.

The information from external applications then proceeds to the Transaction Tracking and Security layer 196, which manages the flow of information from external applications to the server system. Communication between external applications and the server system take place in transactions, wherein external applications send requests to the server system, which acknowledges the requests and responds with the requested information. This layer 196 includes Transaction Tracking functions, which manage these transactions between external applications and the server system, and Security functions, which perform encryption and security functions for these transactions.

Following is the Real-Time Transmission and Queuing layer 198, which carries out the requested transactions in real-time and/or by queuing external application requests. This layer includes Real-Time functions, which process real-time transactions prior to queuing transactions during the external application-server session, and Queuing functions, which process transactions within a single or multiple external application-server sessions.

Next is the Filtering layer 200, which includes functions to optimize and validate data from the external applications. When external application data is sent to the Filtering layer 200, real-time data is sent prior to queued data, and System API data is sent ahead of Content, Database, and Tracking API data. The TCP/IP layer 202 is the standard protocol layer used to send the filtered, encrypted, and compressed external application data to the rest of the server system.

Figure 17:
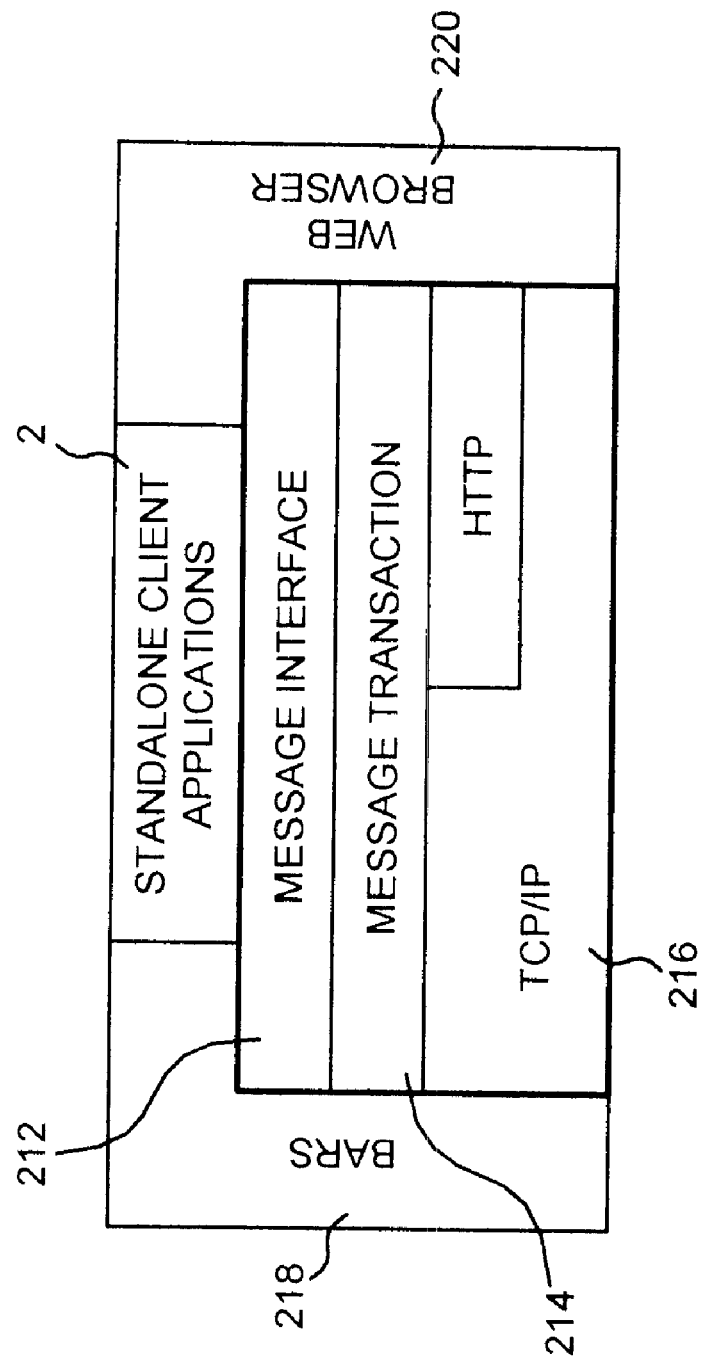
FIG. 17 is a diagram of the message broker protocol in accordance with the present invention.

All communication between the server system and user client applications 2 takes place via the message broker 300 shown in FIG. 17. Referring to FIG. 17, the message broker 300 includes Message Interface 212, Message Transaction 214, and HTTP-TCP/IP 216 layers. These layers are packaged as a unit and installed with the desktop system.

The Message Interface layer 212 is the client-based API used by client applications 2, and includes functions required for client application communication with the communication servers. The Message Interface layer 212 receives client application 2 requests and sends them to the Message Transaction layer 214, which manages the flow of information from client applications 220 to the server system. Communication between the client application 2 and the server system take place in transactions, wherein client applications 2 send requests to the server system, which acknowledges the requests and responds with the requested information. This layer 214 includes functions that manage these transactions client applications and the server system. The HTTP-TCP/IP layer 216 permits the information to safely penetrate firewalls and receive support from proxy servers, and includes HTTP functions, which enable communication with proxy servers and web browsers 220, as well as TCP/IP functions, which enable communication over the Internet and other networked systems. The Task Bar 218 is the dynamic task bar that can be customized by the messages received through the message broker.

The message broker monitors the system for a valid Internet connection and, once connected, communicates with the communication servers to receive information including instructions, software updates, and behavior configuration parameters. If the Internet connection is lost, the message broker sits idle awaiting a valid connection, caching information to be sent to the server system upon reconnecting.

Figure 18:
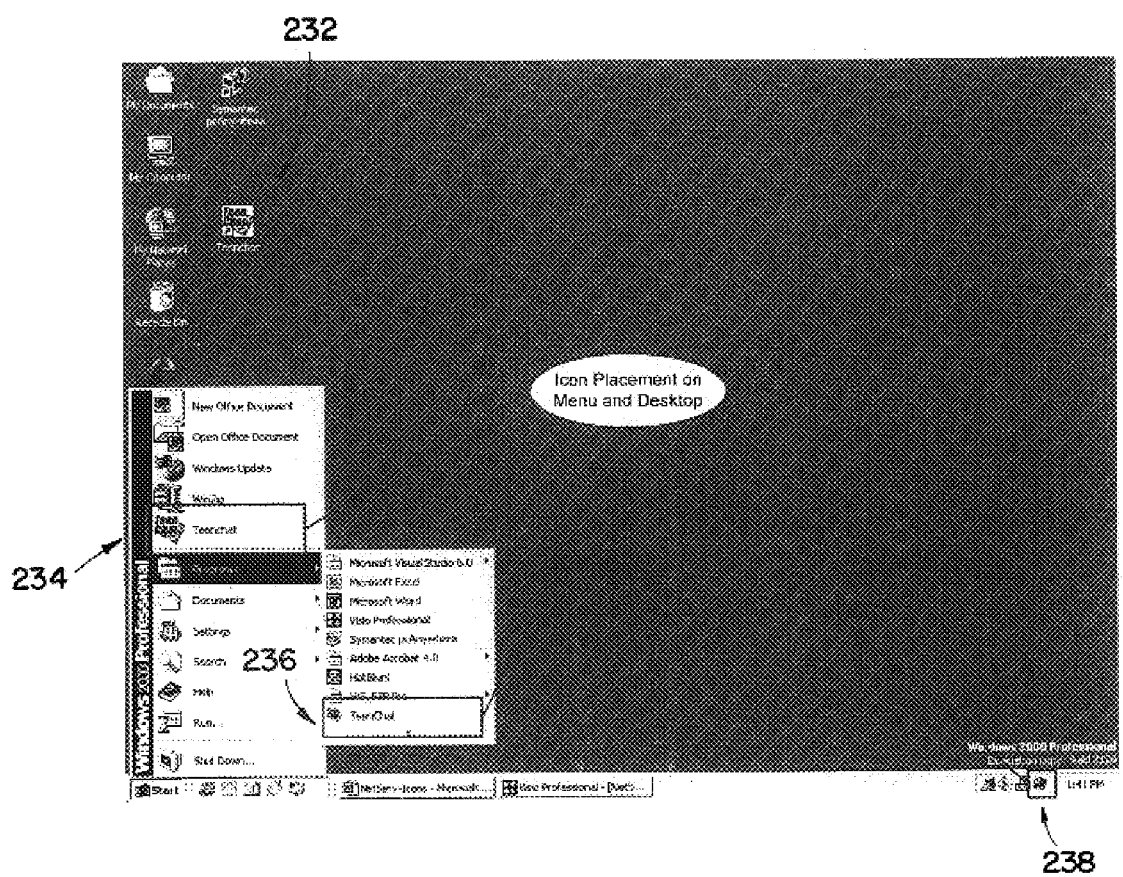
FIG. 18 is a diagram of the web display application's desktop icon placement.

Web display applications are standalone user client programs that install in the user's taskbar tray and provide functions including popup messages, menu items, and invoking web browsers to display specific URLs. Referring to FIG. 18, these applications install in numerous locations, such as shortcuts on the desktop 232, in the program files menu 234, in the start menu 236, and as a tray icon 238. The appearance of each application's tray icon 238 changes based on different factors including the Internet connection status and information received by the application. Applications also self configure based on the user's behavior.

Figure 19:
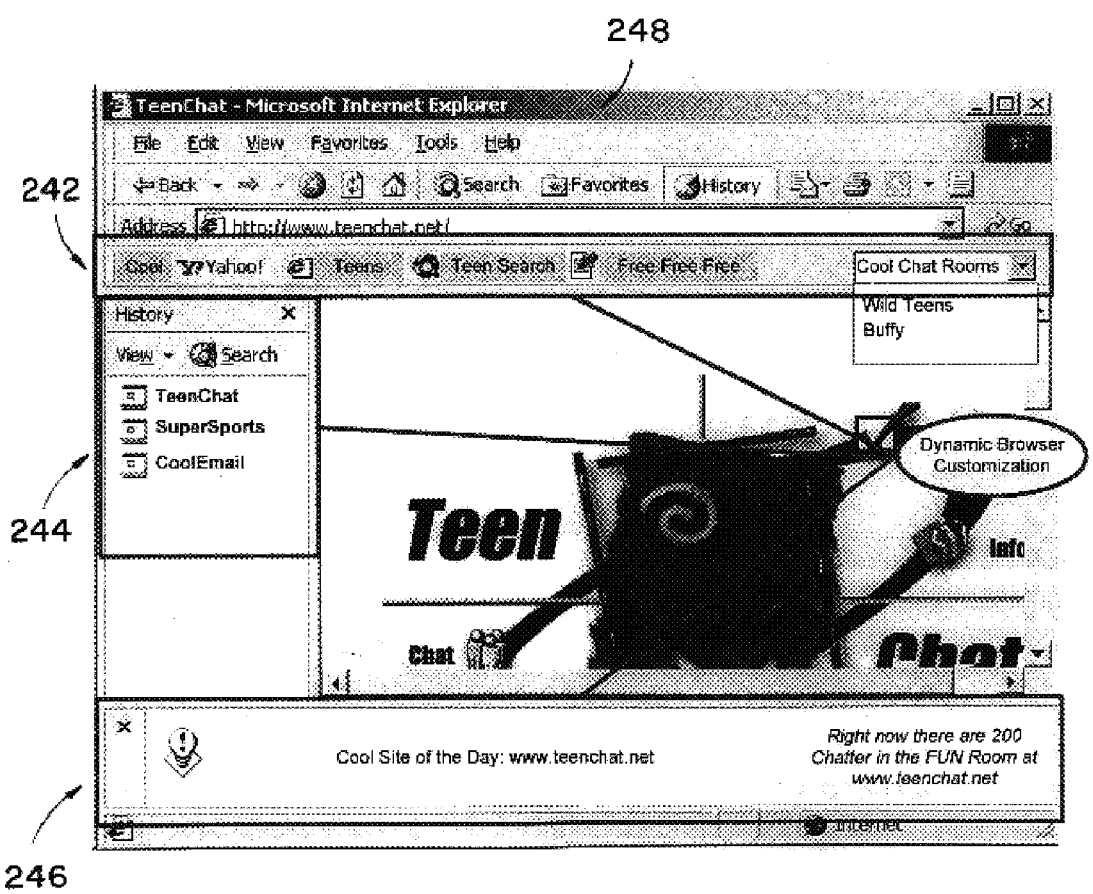
FIG. 19 is a diagram of the dynamic browser customization features.

The extent of application self configuration and browser customization is shown by FIG. 19, which displays portions of the web browser window 248 that are dynamically reconfigured by the server system, including web browser toolbars 242, web address windows 244, and messaging windows 246. Referring to FIG. 19, the web browser toolbar component 242 extends the web browser to include additional toolbars. It includes buttons, input fields, pull-down menus, and user interface elements available on the user's computer. A web address window 244 displays preferred user web sites. A messaging window 246 receives messages from the content servers and displays them to the user.

As the user's behavior and the web site address changes, the web browser 248, toolbar 242, web address window 244, and messaging window 246 components execute instructions generated by the server system and dynamically reconfigure the information they display. The server system also updates these components periodically with the most recent information available. The custom server instructions are based on information including the user's preferences, prior activity, current activity, application activity, and other external information. All this information is stored in the server system's database and log files and used by the server system to generate instructions that modify the browser window 248, toolbar 242, web address window 244, and messaging window 246.

Figure 20:
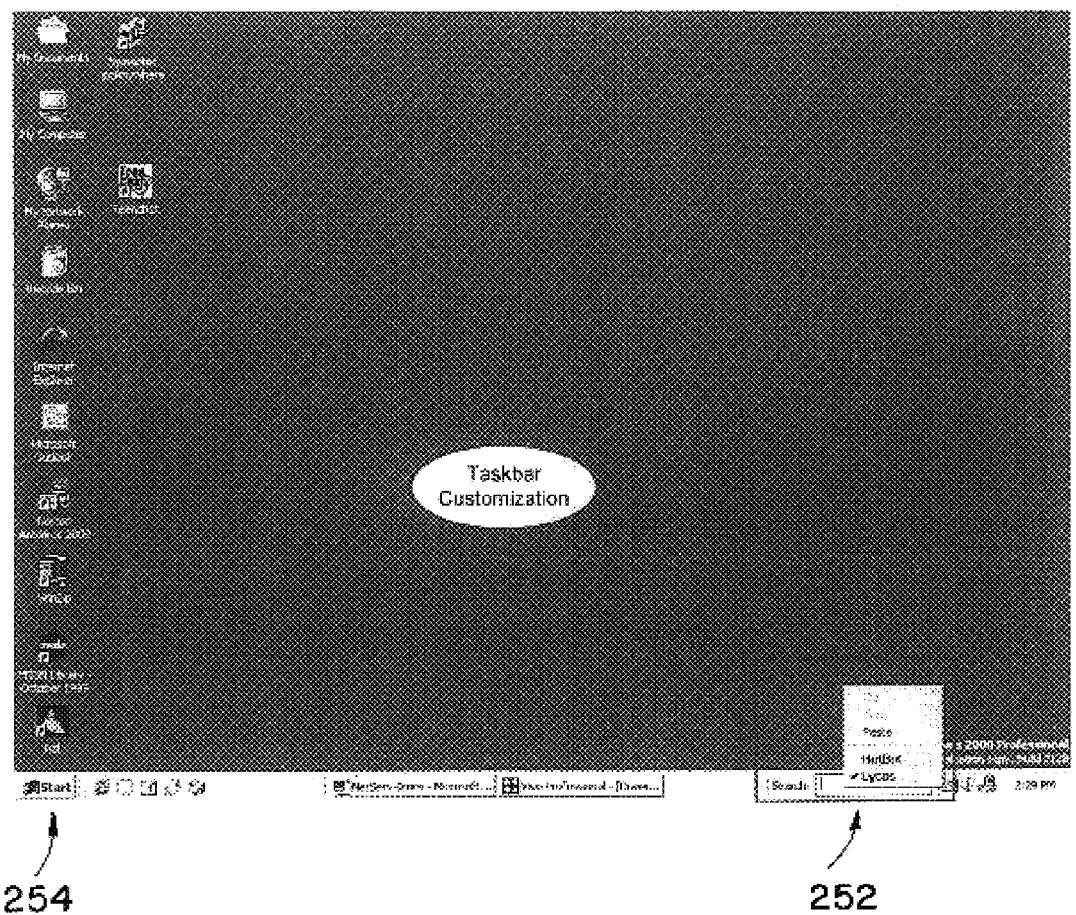
FIG. 20 is a diagram illustrating the desktop taskbar customization feature.

The desktop taskbar application client is shown in FIG. 20. Referring to FIG. 20, the desktop taskbar application 252 runs within the taskbar 254 and provides information to the user that has been previously chosen via a web display application. The desktop taskbar application 252 receives instructions from the communications server via the message broker on what information to display. As the user's behavior and the web site address changes, the desktop taskbar application 252 executes instructions generated by the server system and dynamically reconfigures the information it displays. The server system also updates the desktop taskbar application 252 periodically with the most recent information available. The custom server instructions are based on information including the user's preferences, prior activity, current activity, application activity, and other external information. All this information is stored in the server system's database and log files and used by the server system to generate instructions that modify the desktop taskbar application 252.

According to the present invention, the server system optimizes the appearance of web site information by dynamically configuring client application software in order to optimally present web site information according to factors including the user's history and preferences. User client applications 2 communicate with communication servers 10 to request configuration information, which the communication servers 10 return to the user client applications 2, thereby configuring the user client applications 2.

User client applications 2 record URLs that the user accesses, and the user's activities at those URLs, in order to customize the presentation of web site information. In addition to tracking true URLs for web sites on the Internet, the client-server system can also track user activity for locations that are in the URL format, but are not URLs for Internet web sites. Such URL format locations may include networked files and other resources, which are not connected to the Internet, but which include information whose presentation the user desires the server system to customize. Thus, users who view information with a web browser, and who run the appropriate user client application 2, are not limited to customizing content on Internet web sites, but can also customize the presentation of information that is not at an Internet address, but whose location is still in the URL format.

Customization of the user's web browser takes place on both the client and server side, which first collect URL addresses for the web sites the user visits, and then customize the user's web browser to optimally present information according to factors including the user's preferences and history. On the client side, user client applications 2 register with the user's web browser(s), thereby allowing the client applications 2 to intercept URLs requested by the user, and measure the time a user spends at a URL. The client application 2 collects this information and sends it to the server system using an API from the message broker 300, which separates, stores, and dispenses the information to the server system in batches. The message broker 300 also counts and removes duplicate information, as well as compressing the information, prior to sending it to the server system. Client applications 2 that display URLs but do not register with the user's web browser, such as the desktop system and intelligent toolbars, also send URL information to the server system via the message broker 300.

On the server side, communication servers 10 collect URL information sent by client applications 2, and store the information in the database 18 and log files 20. This information is analyzed to determine the user's behavior and then used to customize the user's client application 2.

For customization, user client applications 2 request custom configuration information from the server system through the message broker 300. This custom configuration information may include graphics, links, chat information, and other information that is used by client applications 2 to configure themselves. Client applications 2 can also send a request through the message broker 300, asking the server system to notify the client applications 2 when they should change their configuration by requesting new custom configuration information.

On the server side, communication servers 10 process URLs sent by the client applications 2 using batch and/or real-time methods. Batch methods are used to recalculate user behavior formulas across a range of users in the database 18, whereas real-time methods are used on a per-user basis after the server system receives URL information sent by user client applications 2. The server system checks the database for new information pertinent to the customization information, uses any new information and the behavior formulas to generate new custom configuration information, and sends the new custom configuration information to the client application 2. Thus, as client applications 2 request new custom configuration information, the server system generates new custom configuration information and sends it to the client applications 2.

Server analysis to generate custom configuration information includes a number of steps. First, the server system performs a number of data counts based on factors including the current session, prior sessions, prior days, prior weeks, and prior months, thereby calculating a plurality of running totals or counts. The number of prior sessions, days, weeks, and months are assigned and configured by the server system. URL totals or counts are counted by domain name only, and the URL count result determines the style of web site the user prefers to view. Page counts for URLs are counted up to a defined number of nested levels, where each level is a slash that separates a portion of the URL domain name. Total time counts are also performed within each counting set according to the total time the user spent at a particular URL in the current session, prior sessions, prior days, prior weeks, and prior months.

After performing the counting step, the server system next performs the weighting step. In the weighting step, each running total is assigned a numerical weighting factor, which is multiplied by the running total results to adjust the relevance of particular running totals. After weighting these running totals or counts, the results are further adjusted according to the amount of time the user spent at each domain and page, thereby generating a plurality of running total scores.

The next step is the style and behavior determination step, in which the server system determines the user's behavior based on the running total scores. To determine the user's preferred style, the server system takes the highest running total score, which indicates the top weighted and adjusted web site, and compares it with the database records for a particular user to determine the client application style the user prefers. If the user does not use a client application 2 for the web site corresponding to the highest running total score, the server may determine the top running total score is inapplicable, and use the next highest running total score to determine the user's preferred style. Thus, the client application 2 will present web site information to the user according to the style of the highest running total score, unless there is no client application 2 for that running total score, in which case the client application 2 may resort to the next best style according to the next highest running total score.

The server system determines the user's behavior by internal and external examination of data that includes running total scores, and other extracted information. Relevant data used by the server system to determine user behavior includes keywords within a web page or URL, keywords within the host portion of a URL, known motifs of a URL domain name, and known motifs of a web page within a specific URL domain name. By determining the motif of particular web site domain names and pages, the server system adjusts custom configuration information sent to client applications 2 to reflect those motifs accessed by the user.

According to the present invention herein described, a number of features will be apparent to those skilled in the art. One feature of the present invention is the ability for a single client application to support multiple users with separate user histories. The client-server system tracks client activity on a per user-per application basis. Thus, multiple users can share a single client application by using separate login identifications which are assigned unique user identifiers. Each user's activity history and customization will be unique because the single application will have multiple unique user identifiers.

Another feature of the present invention is the ability to use different varieties of client applications from a single user. The client-server system tracks client activity on a per user-per application basis. Thus, a single user can use multiple client applications that are assigned separate client identifiers. Each client application's activity history and customization will be unique because the single user will have multiple unique application identifiers for the user's client applications.

An additional feature of the present invention is that multiple client applications can be developed that track a single web site, because the system tracks user activity on a per user-per client basis. Different client application varieties may be developed that have unique features and capabilities such as functionality and speed, thereby making certain client applications preferable for certain users. For example, a client application that contains less functionality but greater speed may be preferable to users who value efficiency, whereas another client application that has extended functionality but less speed may be preferable to users that value presentation and detail. Yet both client applications can be used to track and customize a single web site, because the client-server system tracks activities on a per user-per application basis, rather than a per user-per web site basis.

A further feature of the present invention is that a single user can install and use multiple client applications that track the same web site, because the client-server system tracks activities on a per user-per application basis. Thus, a single user can download and install multiple client applications that are tailored for uses such as speed or functionality even though both client applications track the same web site. The user then runs the appropriate client application according to their current need, and separate activity histories and customization results are generated for each client application.

Another feature of the present invention is that the client-server system can support multiple instantiations or profiles of identical client applications for a single user. By adding a client application instantiation/profile field under the appropriate records and log files, multiple instances of the same client program can be tracked independently by the client-server system. Such a system would track client activities on a per user-per client-per instance/profile basis. Each instantiation or profile would have its own unique user history and corresponding customization features. Thus, a user could install multiple instances of identical client application, or load separate profiles of an identical client application, and the server system would generate separate activity history and customization for each client instance or profile.

A further feature of the present invention is the ability to send users custom messages directly from a web site based on the user's activity history. The external interface permits web site owners to broadcast messages to different users according to the each user's interests. These messages may include promotional information, advertisements, news, and other information that is generated by the web site. The external interface also provides connections into other systems including ad servers, chat, instant messaging, and other databases and systems that enhance the ability of the system to provide the user with relevant information during their online and offline session. These external systems may collect user information from the system, send information to the system, publish content to the system for distribution and send information to the system, including music, video clips and special offers.

An additional feature of the present invention is the ability to provide statistical information to different web sites based on the user's activity information. Different user records and log files can be used to determine features including the number of users visiting a web site, the amount of time users are at a web site, the web site's most accessed features, and the activities users execute at the web site. This information can be provided to web site owners as feedback for the owners to make changes to the web site, thereby making the web site more attractive to users.

Other features of the present invention include its ability to dynamically configure the user web-browsing environment to provide the most effective and efficient web browsing experience by presenting the user with information relevant to their current subject. The system can also record areas and subject matter the that the user visits and provides the user with ancillary information via the client software interface. The user can further be notified asynchronously of promotions or other information that pertains to their browsing habits. Thus, the user receives information based not only on the direct web sites the user has visited, but additional information related to the subject matter of the web sites the user has visited.

An additional feature of the present invention is that the client components are integrated into the browser and desktop providing the user with information whenever they are connected to the Internet. The system provides both a client software interface and server interface for expanding the user's experience through additional augmenting software. Thus, the client and server session detect when a user is online or offline and make adjusts to the client presentation based on heuristics at the server.

While the invention has been particularly shown and described with reference to preferred embodiments thereof, it will be understood by those skilled in the art that various changes in form and details may be made therein without departing from the spirit and scope of the invention.

We claim:

1. A method for dynamically providing information to a user via a visual display associated with a user computer, the method comprising the following steps:

assigning the user a user identification code;

assigning an application code to at least a first website and a second website to be viewed by said user;

recording the user's activity associated with said first and second websites by monitoring said user identification code and said application code;

determining the user's viewing preference associated with said first website based on the user's activity associated with said first website;

determining the user's viewing preference associated with said second website based on the user's activity associated with said second website;

dynamically adjusting the user's display in accordance with the user's preference associated with the website being viewed by the user;

generating a session identifier for tracking application activities, the session identifier including the application code associated with the website and an application name field indicating the textual name associated with the website; and transmitting messages to be displayed the user, and wherein the session identifier further includes an application message interval field indicating a period of time between messages sent from a message queue to the application, a welcome wait interval which indicates an amount of time to wait before requesting a next display message from the message queue, and a query time interval which indicates a period of time between application queries for additional information.

2. A method for dynamically providing information to a user via a visual display associated with a user computer, the method comprising the following steps:

assigning the user a user identification code;

assigning an application code to at least a first website and a second website to be viewed by said user;

recording the user's activity associated with said first and second websites by monitoring said user identification code and said application code;

determining the user's viewing preference associated with said first website based on the user's activity associated with said first website;

determining the user's viewing preference associated with said second website based on the user's activity associated with said second website;

dynamically adjusting the user's display in accordance with the user's preference associated with the website being viewed by the user; and generating a message queue record indicating a list of messages to be displayed to the user, the message queue record including the user identification code or a similar unique identifier associated with the user, a behavior type field indicating a user behavior for which messages in the queue will be transmitted to the user, a message number field indicating a sequential number assigned to each message, a messages field which indicates the list of messages to be transmitted to the user, and a URL field indicating a web address to be transmitted to the user, wherein the message queue record further includes a mode indication indicating whether the message will be displayed as a popup window or whether the application associated with the message will be pulsed when the message is transmitted to the user.

3. A method for dynamically providing information to a user via a visual display associated with a user computer, the method comprising the following steps:

assigning the user a user identification code;

assigning an application code to at least a first website and a second website to be viewed by said user;

recording the user's activity associated with said first and second websites by monitoring said user identification code and said application code;

determining the user's viewing preference associated with said first website based on the user's activity associated with said first website;

determining the user's viewing preference associated with said second website based on the user's activity associated with said second website;

dynamically adjusting the user's display in accordance with the user's preference associated with the website being viewed by the user;

generating a message queue record indicating a list of messages to be displayed to the user, the message queue record including the user identification code or a similar unique identifier associated with the user, a behavior type field indicating a user behavior for which messages in the queue will be transmitted to the user, a message number field indicating a sequential number assigned to each message, a messages field which indicates the list of messages to be transmitted to the user, and a URL field indicating a web address to be transmitted to the user; and requesting a message to be displayed to the user in accordance with a welcome wait interval which indicates an amount of time to wait before requesting a next display message from the message queue; and selecting a message to be displayed to the user in accordance with the identification of the user and the user's behavior type.

4. The method of claim 3, further comprising the step of transmitting the selected message to the user in accordance with an application message interval and displaying the selected message in accordance with the user's display preferences.

5. A method for dynamically providing information to a user via a visual display associated with a user computer, the method comprising the following steps:

assigning the user a user identification code;

assigning an application code to at least a first website and a second website to be viewed by said user;

recording the user's activity associated with said first and second websites by monitoring said user identification code and said application code;

determining the user's viewing preference associated with said first website based on the user's activity associated with said first website;

determining the user's viewing preference associated with said second website based on the user's activity associated with said second website;

dynamically adjusting the user's display in accordance with the user's preference associated with the website being viewed by the user further comprising the steps of performing at least one data count based on the user's prior usage history, and weighting the at least one data count to adjust the relevance of the at lease one data count to produce a running total score for at least one website viewed by the user; and determining the user's behavior by selecting the website with the highest running total score.

6. The method of claim 5, further comprising the step of determining the user's behavior by selecting the website with the second highest running total score in the event that the user does not have a client application corresponding to the website with the highest running total score.

* * * * *